United States Patent [19]

Oberholtzer et al.

[11] 4,140,524

[45] Feb. 20, 1979

[54] LOW ALLOY BAND SAW STEEL AND METHOD OF MAKING THE SAME

[75] Inventors: James R. Oberholtzer; Thoni V. Philip, both of Reading, Pa.

[73] Assignee: Carpenter Technology Corporation, Reading, Pa.

[21] Appl. No.: 439,048

[22] Filed: Feb. 4, 1974

[51] Int. Cl.² .............................................. C22C 38/02
[52] U.S. Cl. .................................. 75/123 J; 75/123 K; 75/123 L; 75/123 M; 148/12.4; 148/36; 148/39
[58] Field of Search .............. 75/123 J, 123 L, 123 B, 75/123 D, 123 G, 123 K, 123 M, 126 C, 126 D, 126 E, 126 F, 126 J, 126 O, 128 C, 128 P, 128 N, 128 G, 128 T, 128 W, 128 V; 148/36, 39, 12.4, 2

[56] References Cited

U.S. PATENT DOCUMENTS

| Re. 17,846 | 10/1930 | Brown | 75/123 J |
|---|---|---|---|
| 1,680,301 | 8/1928 | Norris | 75/123 J |
| 1,927,986 | 9/1933 | Levy | 75/123 J |

Primary Examiner—R. Dean
Attorney, Agent, or Firm—Edgar N. Jay

[57] ABSTRACT

A low alloy temper resistant saw blade steel containing about 0.90–1.4% carbon, 0.8–2% silicon, 0.5–1.5% vanadium, 1–3% tungsten plus twice the percent molybdenum, and the balance iron plus incidental impurities having a minimum hardness of Rc 60 in its hardness and tempered condition and which is not softened by exposure to temperatures of about 600° F. A process for preparing the steel is also disclosed in which the alloy is hot worked to strip which is then austenitized, isothermally transformed at least in part to bainite, and subjected to a subcritical anneal to form a pinpoint carbide structure with hardness reduced sufficiently to facilitate fabrication of the saw teeth. After the saw teeth are formed and set, the heat treatment is completed by flame hardening the teeth and tempering so that the teeth are at a minimum hardness of about Rc 60 and do not soften when exposed to temperatures of about 600° F.

21 Claims, No Drawings

LOW ALLOY BAND SAW STEEL AND METHOD OF MAKING THE SAME

BACKGROUND OF THE INVENTION

This invention relates to low alloy temper resistant tool steel and, more particularly, to such a steel which is especially well suited for use in making saw blades as well as a process for making the same.

Hitherto, the selection of steels available for use in providing the stock for making band saws has left much to be desired. On the one hand, the selection included high speed grades such as A.I.S.I. Type M2 which is relatively expensive because of the substantial amounts of alloying additions but which is generally tempered at about 1100° F. to a hardness of about Rockwell C (Rc) 63 thereby providing a useful temperature range up to about 1100° F., and, on the other hand, such high carbon grades as 1.25-1.3% carbon steel or A.I.S.I. Type 50100 containing 1-1.10% carbon and 0.50% chromium which is relatively inexpensive but which is normally tempered at about 350° F. to Rc 63 and has a low useful temperature range. (Here and elsewhere throughout this application by percent is meant weight percent and the balance of each analysis unless otherwise stated is iron plus incidental impurities.) Alloys such as that set forth in U.S. Pat. No. 3,758,297 are not significantly less expensive than A.I.S.I. Type M2 because, inspite of the reduction in molybdenum to 1.3-1.6%, the tungsten content of 6-6.4% leaves the composition expensive when the maximum temperature anticipated in use will be less than about 600° F.

SUMMARY OF THE INVENTION

It is, therefore, a principal object of this invention to provide a low alloy, temper resistant tool steel which can be tempered to a minimum room temperature hardness of Rc 60 and which is resistant to the heat generated in normal use as a saw blade.

A more specific object is to provide such a steel which is substantially less costly than Type M2, which can be tempered to a minimum hardness of about Rc 60, and which in its hardened and tempered condition is capable of reaching a temperature of about 600° F. without a loss of room temperature hardness, i.e. without softening, thereby combining properties which are much superior to those of the high carbon grades with a cost which is significantly less than that of the high speed steels.

A further object is to provide such a steel which can be austenitized without solutioning the alloy additions to an extent which would objectionably affect the desired bainite transformation in subsequent processing, which can be placed in a relatively soft ductile intermediate form suitable for use in forming saw blades, particularly band saw blades, and which in finished form responds extremely rapidly to hardening treatment so that the saw teeth can be brought to a high hardness by a very short exposure to a flame.

It is also an object of this invention to provide a process for making such a steel into strip having a preferred microstructure which is soft enough for fabrication into saw blades by forming and setting teeth therealong with a minimum of tool wear consistent with the final properties required in the finished saw blade, and which can be heat treated at high speed by the saw blade fabricator.

DESCRIPTION OF THE PREFERRED EMBODIMENTS

The foregoing as well as further objects and advantages of the present invention are attained by providing a composition which in weight percent consists essentially of about 0.90-1.4%, preferably 1.1-1.3%, carbon; 0.8-2%, preferably 1-1.5%, silicon; 0.5-1.5%, preferably 0.75-1.2%, vanadium; 1-3% tungsten plus twice the percent molybdenum, preferably 0.75-1.2% molybdenum with no more than residual tungsten; and the balance essentially iron and incidental impurities. Impurities should be carefully controlled to avoid objectionable retardation of the formation of bainite in the alloy and, particularly, chromium is limited to no more than about 0.25%, preferably to no more than about 0.2%, manganese is limited to no more than about 0.5%, preferably to no more than about 0.35%, and nickel is limited to no more than about 0.5%, preferably to no more than about 0.25%. Some nitrogen may be present in the steel consistent with the way the steel is melted but preferably no more than about 0.02% should be present when the alloy is melted in air. Phosphorus and sulfur should each be limited to no more than about 0.025%. So long as the required properties are not significantly impaired, particularly fatigue life, either titanium or columbium may also be present in a small amount but no more than about 0.2% for additional wear resistance.

In this composition, a minimum of about 0.90% carbon is required to provide consistently the minimum as tempered hardness of about Rc 60 when the alloy is tempered at about 600° F. When carbon is present in amounts above about 1.4%, it tends to stabilize austenite which is not desired because of its retarding effect on the bainite transformation and because of the attendant difficulty in obtaining the desired hardness. Excessive carbon or other strong austenite-forming elements such as nitrogen may also cause dimensional instability by causing the presence of retained austenite which on transformation to martensite results in a size change. When the larger amounts of carbon up to about 1.4% are used, the amount of vanadium should be on the high side of its range to minimize the possibility that graphite can be formed. Preferably, about 1.1-1.3% carbon is used.

Silicon contributes largely to the temper resistance of this composition and for this purpose 0.8-2% silicon can be used. In balancing the composition, care should be used to avoid excessive silicon which can cause the formation of graphite. Thus, preferably 1-1.5% silicon is used.

Vanadium forms hard, wear-resistant vanadium carbide and, by tying up some of the carbon, works to prevent graphitization. When present in amounts greater than about 1.5%, vanadium does not provide sufficient benefit to warrant the additional cost. Therefore, 0.5-1.5%, preferably 0.75-1.2%, vanadium is present in this composition.

Molybdenum also contributes to the desired temper resistance of the composition and also forms carbides which contribute to wear resistance, but not as effectively as the vanadium carbides. Thus, 0.5-1.5%, preferably 0.75-1.2%, molybdenum is present in this composition. While tungsten is not included in the preferred composition of this invention because it objectionably increases its cost, it can be substituted in the broad range for molybdenum in the ratio of their atomic weights or about 2 to 1 tungsten for molybdenum.

Manganese, like chromium and nickel, tends to delay the bainite transformation in this alloy, and, therefore, no more than about 0.5%, preferably no more than about 0.35%, should be used. Depending on the cost involved, manganese can be reduced even further to as low an amount as practical.

No special metallurgical procedures are required in melting the composition of this invention. It is readily prepared using conventional techniques in an electric arc furnace, by vacuum melting or by any other desired technique.

When melted and cast as ingots, the alloy is readily forged from a temperature of about 1900° to 2100° F. Good results are achieved by forging from a temperature of about 2000° F. to billets which are hot rolled from about 1950° to 2050° F., preferably 2000° F., to strip which, after heat treatment, is cold rolled, annealed as required and slit to size before being shipped as saw blade blank strip to a fabricator who forms the saw blade teeth and then hardens and tempers the teeth.

To facilitate formation of the saw teeth with a minimum of tool wear, fabricators desire that such blank saw blade strip have an optimum hardness, less than about Rc 35 preferably about Rc 28 to Rc 32, which requires annealing of from 1 to 3 hours. Longer annealing should be avoided because of the undesired growth of the carbides which is caused thereby. In order to satisfy the fabricators requirement for exceedingly rapid response to hardening, exceedingly fine and substantially uniformly dispersed carbides are required in a ferritic matrix which are readily formed in accordance with the present invention as will be more fully pointed out hereinafter.

In order that the saw blade blank strip be economical to manufacture, it should respond sufficiently rapidly to heat treatments so that it is not only transformed to a desired microstructure, but also has sufficient ductility that when such relatively long duration heat treatment steps as a 1-3 hour anneal must be carried out, the relatively long lengths of the material that are required can be coiled and placed in an enclosure, such as a bell, for annealing.

The hot worked material, before being cold worked is austenitized, transformed at least in part to bainite to provide sufficient ductility to facilitate handling, and subjected to a subcritical anneal long enough to ensure no more than a tolerable hardness during further working and shaping.

To minimize solutioning of elements which tend to retard the bainite transformation, the alloy is austenitized at as low a temperature and for as short a time as is consistent with complete solutioning of all prior carbide structures and their membranes, but not the large vanadium carbides. Thus, austenitizing can be carried out at about 1700° to 2000° F. although for compositions containing the lowest amounts of carbon and other additions, a temperature as low as about 1600° F. may be used. The time required depends on the temperature and may range from about 1 to 5 minutes from the higher to the lower temperatures used in the case of strip about 0.08 to 0.09 in. thick. Preferably austenitizing is carried out at about 1800° F. for about 2 minutes.

The bainite transformation proceeds most rapidly at about 800° F. and the austenitized material is preferably isothermally held at that temperature at least long enough for about 20 to 25% transformation to bainite or at least sufficient bainite is formed to provide the minimum amount of ductility required to permit processing without cracking or breaking due to brittleness. This is preferably accomplished by quenching into and transforming for the desired length of time in a salt bath held at about 800° F. to form at least sufficient bainite to impart the ductility required for drawing the strip through the process line and also to permit coiling prior to completion of annealing when that is desired. The maximum temperature at which the transformation to bainite can be carried out is about 900° F. and except as limited by practical considerations a temperature as low as one just above the $M_s$ temperature of about 350° F. could be used. Because of the long time required at lower temperatures, the isothermal treatment is preferably carried out no lower than about 700° F.

After the formation of the required amount of bainite, the strip is cleaned as required and then subjected to a subcritical anneal, that is at a temperature below the $A_{c1}$ temperature of the alloy, for a time long enough to provide a very fine, substantially uniformly dispersed carbide structure which is sometimes called a pinpoint carbide structure and will be so designated hereinafter. Good results can be obtained when annealing is carried out at about 1300°-1400° F. The desired pinpoint carbide structure is obtained in about 5 minutes and annealing is continued beyond that long enough to reduce the hardness to the desired level. To provide a hardness of about Rc 28-32, annealing is carried out for 1 to 3 hours, preferably at about 1370° F. for about 2 hours. Longer annealing times than about 3 hours tend to promote growth of the carbides and should not be used. By minimizing the size of the carbides, the rate of response to subsequent hardening is maximized.

It should also be noted that by a pinpoint carbide structure is meant carbides which are preferably no larger than about 0.25 micron and are substantially uniformly distributed. It is believed that these small carbides are formed primarily by molybdenum and iron and some silicon will be in solution in these carbides. Substantially all of the vanadium carbides are much larger than the pinpoint carbides and it is these larger vanadium carbides which primarily provide the wear resistance of the material.

After annealing to the desired reduction in hardness, the material is cold rolled, with intermediate anneals as required, to the desired thickness, slit to width and deburred. In that condition the material has the thickness and width required by the saw blade manufacturer who then forms and sets the saw teeth and completes the heat treatment by hardening and tempering the teeth. In some instances the back portion of the blade may also be hardened to some extent. In any event, the teeth are usually flame hardened by exposing the saw blade teeth to a flame which brings them to a temperature of about 1700° F. for about 5 seconds followed by an oil quench and then tempering at about 550° to 650° F., preferably 600° F., for about 1 hour. When the back portion of the blade is also hardened, it may have a hardness of about Rc 40 but the teeth in the hardened and tempered condition will have a hardness of no less than about Rc 60. As is well known saw blades for use in band saws or hacksaws may vary in width and thickness. For example, sizes often used may range from about 0.25 in. wide by 0.020 in. thick to about 2 ins. wide by 0.050 in. thick.

A preferred analysis of this composition consists essentially of about 1.2% carbon, 1.0% silicon, 1.0% vanadium, 1.0% molybdenum and the balance iron except for incidental impurities.

As an illustrative example of the alloy of this invention, an experimental heat was melted and cast containing 1.19% carbon, 0.27% manganese, 0.98% silicon, 0.004% phosphorus, 0.003% sulfur, less than 0.01% chromium, 0.05% nickel, 0.91% molybdenum, 1.01% vanadium and the balance iron except for incidental impurities. The ingot was forged to a ¾ in. by 1 in. billet from a furnace temperature of 2050° F. Hot rolling to bands about 0.065 in. and 0.075 in. thick and 1⅝ in. wide was carried out from 2050° F. and then the hot rolled strip was allowed to cool. In this condition, to facilitate further processing a stress relief anneal is desirable and can be carried out by annealing for about 1 hour at about 1100° to 1350° F. A 1 hour stress relief anneal at about 1240° F. gave good results. The strips were austenitized at about 1800° F. and transformed sufficiently (about 20 to 25%) at 800° F. for about 6 minutes. The optimum subcritical annealing temperature for this composition was found to be at about 1370° F., 1400° F. being somewhat high for an exposure of 2 hours because the material appears to begin to reharden. When annealed for about 5 minutes at about 1425° F., the hardness of the strips was about Rc 37.5, low enough to permit coiling and enclosing for completion of a 2 hour subcritical anneal to a hardness of about Rc 31.5.

The strip can then be readily cold rolled to the saw blade fabricator's dimensions. It lends itself to the formation and heat treatment of the blade teeth. When flame hardened and tempered at about 600° F., saw blades with teeth having a minimum hardness of Rc 60 can be provided which do not soften when exposed to temperatures as high as 600° F.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A low alloy temper resistant saw blade steel which in its annealed condition has a fine carbide structure with substantially all carbides no larger than about 0.25 microns except vanadium carbides and substantially all uniformly dispersed in a substantially fully ferritic matrix, which in its hardened and tempered condition has a room temperature hardness of at least Rc 60 and which does not soften on exposure to temperatures as high as about 600° F., and which contains vanadium carbides substantially all of which are larger than about 0.25 microns, consisting essentially of about 1.1–1.4% carbon, 0.8–2% silicon, 0.75–1.5% vanadium, 0.5–1.5% molybdenum, 0–3% tungsten as a substitute for all or part of the molybdenum in the ratio of about 2 to 1, up to about 0.2% of an element selected from the group consisting of titanium and columbium, and the balance essentially iron and incidental impurities but no more than about 0.25% chromium, no more than about 0.5% manganese, no more than about 0.5% nickel, no more than about 0.02% nitrogen, no more than about 0.025% phosphorus and no more than about 0.025% sulfur.

2. The steel set forth in claim 1 containing 1.1–1.3% carbon.

3. The steel set forth in claim 2 containing 1–1.5% silicon.

4. The steel set forth in claim 3 containing 0.75–1.2% vanadium.

5. The steel set forth in claim 4 containing 0.75–1.2% molybdenum with no more than residual tungsten.

6. The steel set forth in claim 5 containing no more than about 0.2% chromium, no more than about 0.35% manganese, and no more than about 0.25% nickel.

7. The steel set forth in claim 1 containing no more than about 0.2% chromium, no more than about 0.35% manganese, and no more than about 0.25% nickel.

8. The steel set forth in claim 7 containing about 1.2% carbon, 1% silicon, 1% vanadium, and 1% molybdenum.

9. The steel set forth in claim 7 containing about 1.19% carbon, 0.98% silicon, 0.91% molybdenum, and 1.0% vanadium.

10. The process of making saw blade steel which includes the steps of making and hot working steel having the composition set forth in claim 1 to form strip, austenitizing the thus formed strip to substantially completely solution all prior carbide structures and their membranes except vanadium carbides by heating to a temperature of about 1600°–2000° F., then substantially isothermally transforming at least about 20% of the austenite in the microstructure of the austenitized strip to bainite by isothermally holding the same at a temperature above the $M_s$ temperature of the steel but no greater than about 900° F., and then subjecting the strip to a subcritical anneal long enough to provide a pinpoint carbide structure in a substantially fully ferritic microstructure which is soft enough for cold rolling and forming saw blade teeth along the strip.

11. The process set forth in claim 10 which includes the steps of cold rolling said annealed strip, forming saw teeth along the cold rolled strip, hardening at least the toothed portion of said strip, and then tempering the strip so that the teeth have a room temperature hardness of at least about Rockwell C 60 and do not soften after exposure to a temperature of about 600° F.

12. The process set forth in claim 10 in which said strip is austenitized at a temperature of about 1700°–2000° F.

13. The process set forth in claim 12 in which said strip is austenitized at a temperature of about 1800° F.

14. The process set forth in claim 12 in which the bainite transformation is carried out at a temperature of about 700°–900° F.

15. The process set forth in claim 14 in which the bainite transformation is carried out at a temperature of about 800° F.

16. The process set forth in claim 14 in which the subcritical anneal is carried out at about 1300°–1400° F. so that the annealed strip is no harder than about Rc 35.

17. The process as set forth in claim 16 in which said annealed strip has a hardness of about Rc 28–32.

18. The process as set forth in claim 16 which includes the step of cold rolling said annealed strip, then forming saw teeth along the cold rolled strip, flame hardening the toothed portion of said strip, and then tempering said strip at a temperature of about 550°–650° F.

19. The process as set forth in claim 18 in which said strip is austenitized at a temperature of about 1800° F.

20. The process as set forth in claim 18 in which the bainite transformation is carried out at a temperature of about 800° F.

21. The process as set forth in claim 20 in which said strip is tempered at a temperature of about 600° F.

* * * * *